Sept. 7, 1926.  1,598,938
J. C. SHARP
LUBRICATOR
Filed Dec. 11, 1922
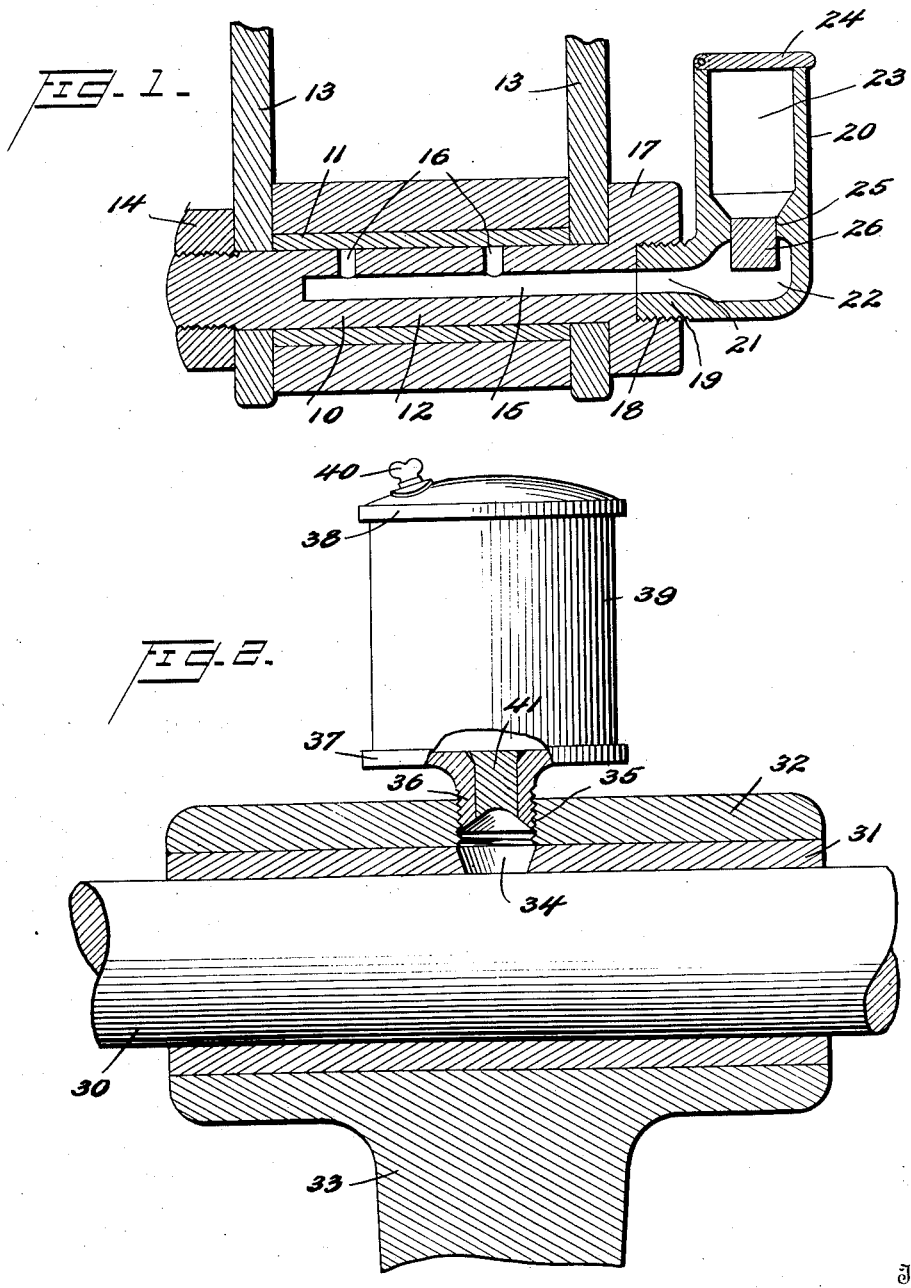
Inventor
John C. Sharp
By C. J. Stockman
Attorney Patented Sept. 7, 1926.

1,598,938

UNITED STATES PATENT OFFICE.

JOHN CESSNA SHARP, OF CHATTANOOGA, TENNESSEE.

LUBRICATOR.

Application filed December 11, 1922. Serial No. 606,333.

This invention relates to lubricating devices and particularly to those devices where it is desired to have a constant but limited flow of the lubricant to bearing surfaces.

The problem of lubrication may be stated as being the delivery of the proper amount, and no more, of lubricant to the bearing surfaces and in preventing the entry of substances other than the lubricant to the bearing. Great difficulty has been found in providing feeders for oil cups and similar oil feeders where a limited amount of oil is required over a long period of time and without attention. Various means have been provided for regulating the amount of oil. These have for one reason or another been unsuccessful or only partially successful. Greatest difficulty, perhaps, has been caused by the difficulty of the regulation of the proper amount and by stoppage due to entry of foreign substances into the feed duct.

A very important object of this invention is to provide a lubricating means which will be characterized (1) by extreme simplicity of construction; (2) by remarkable economy in the use of oil while securing an adequate supply of filtered and uncontaminated oil to the part to be lubricated at all times; and (3) by an entire absence of valvular or other elements calling for thought or attention in order that the flow of oil to the part to be lubricated may be regulated. This object is best secured from the construction illustrated which consists, as shown, of two parts only, to wit, an oil cup of a simple and well known and inexpensive construction and a closed-grained-wood oil feeder and filter fixedly secured in the neck of the cup, between the reservoir portion of the cup and the part to be lubricated.

Other objects and advantages of my invention will be apparent to those skilled in the art in adapting my invention to their specific needs.

Referring to the drawing where I have illustrated embodiments of my invention,

Figure 1 represents a cross section of a form of my invention as applied to a spring shackle bolt of an automobile and Figure 2 represents a modification applied to a horizontal shaft bearing.

Referring particularly to Figure 1, 10 designates the rolled end of the long leaf of an automobile spring, 11 the bushing and 12 the shackle bolt, 13 are the shackle links connecting the spring with the frame. The bolt 12 secures the spring and the shackle links together, the parts being secured by the nut 14. Within the bolt 12 is an oil duct 15 having branch ducts 16 leading to the bushing and for delivering the oil to the bearing surfaces. The head 17 is provided with an interiorly threaded portion 18 to receive the threaded end 19 of the oil feeder cup 20.

The threaded portion 19 is provided with a duct 21 which communicates with the oil duct 15 at one end and the delivery chamber 22 at its other end. A reservoir 23 is provided into which the oil is placed. The cover 24, which is hingedly connected to the top of the cup 20 is provided to cover the opening to the reservoir 23, through which oil is introduced.

Between the reservoir 23 and the chamber 22 is an opening 25 in the metal. This opening is filled with a close-grained wooden plug 26, which latter has its pores open sufficiently to permit oil to pass very slowly into the chamber 22.

In the construction shown in Figure 1, the oil passes very slowly through the pores of the wooden plug and is delivered to the oil supply in the chamber 22. At intervals when the oil reaches the level of the openings of the ducts 16 the oil will be fed to the bearing surfaces. This feeding action may also take place due to the movement of the automobile over the road.

Referring now particularly to Figure 2, 30 designates a shaft and 31 designates a bushing or soft metal bearing in which the shaft 30 turns. The bushing 31 is mounted in the bearing 32 which may be supported by a bracket 33.

Lubrication for the shaft 30 is provided through the opening 34 which passes through the parts 32 and 31. The outer end of the opening 34 is screw threaded as at 35.

A suitable oil reservoir is provided having communication with the opening 34 to the shaft. The modification here illustrated has a delivery stem 36 having screw threads registering with the threads of the opening 34. Between the flange 37 and head 38 is carried a glass cylinder 39 through which the oil may be seen. A screw cap 40 closes an opening in the head 38 by which the oil reservoir is filled. An opening is provided from the reservoir to the bottom of the stem 36. This opening is closed by a close grained wooden plug 41 having its pores sufficiently open to feed oil slowly from the reservoir 39 to the opening 34. In this form, I have shown the wooden plug and the bottom of the stem 36 as being downwardly and outwardly tapered in order to spread the oil thus delivered to the sides of the opening 34. It is apparent that the oil which passes through the pores of the plug 41 will be fed very slowly, the amount passing depending upon the dimensions of the plug and the freedom with which the oil may pass through the pores.

A wood which I have found suitable for these plugs is straight grained white pine with the pores thereof opened in any suitable manner to permit the passage of the oil. While the oil is permitted to pass, this plug as well as the plug 26, prevents the passage of dirt and other foreign matter. The pores of the wood are so small that, while sufficient lubricant is furnished for the bearing surfaces, there is no excess oil to run out and be wasted, as well as cause an unsightly appearance to the machinery.

My preferred method of inserting the plug into the opening which it is to occupy, is to provide a countersunk portion, the main opening having a smaller diameter than the plug. The plug is entered into the countersink and is then forced to its proper position. This compresses the wood and to an extent shuts off the flowing of oil through the pores. This restriction has been found to be desirable.

Particular attention is called to the simplicity of the construction, it being evident that the necessity for the provision of valves or other parts which call for attention is obviated by the construction illustrated. The oil cup is of simple and inexpensive construction readily procurable in the open market and the plug may be applied thereto at a nominal cost, and when so applied will form, with said cup, a lubricating means of very inexpensive construction and one which will operate for a long time without any attention whatever. Its use, moreover, results in marked economy in the use of oil and at the same time assures that the part to be lubricated will receive a sufficient amount of oil without any danger of an excess supply, which excess, as is well known, is a prolific source of trouble in lubricators generally and results not only in waste of oil but oftentimes in injury due to gumming of the parts to which the lubricant is applied in excessive quantity. The only attention which this lubricating means requires is the renewal of the supply of oil when the oil in the reservoir has been exhausted, and the period when such renewal is necessary has been greatly prolonged by the economical use of the oil brought about by the construction described, this economical use of oil also resulting as is obvious in savings in the cost of the oil as well as overcoming, as before stated, the troubles incident to overlubrication.

While I have shown and described in detail certain embodiments of my invention, I desire to have it understood that I do not limit myself to the exact structures shown and that modifications and changes may be made without departing from the spirit of my invention and within the scope of the appended claims.

Having described my invention, what I claim is:—

1. A lubricating device comprising an oil tight oil cup having an oil reservoir and an opening adjacent the lower end of the reservoir and a wooden plug, of normal greater dimensions than the hole, fixed in the opening, the plug having had its pores sufficiently opened to permit passage of the oil.

2. A lubricating device consisting of an oil cup having an oil reservoir and a neck or hollow stem for connecting the cup to the part to be lubricated, and a wooden oil feeding plug fixedly secured in the cup and controlling the supply of oil therefrom, said plug having its pores opened sufficiently to permit passage of oil.

3. A lubricating device consisting of an oil cup having an oil reservoir and a neck or hollow stem for connecting the cup to the part to be lubricated, and a wooden oil feeding plug fixedly secured in said neck of the cup and controlling the supply of oil therefrom, said plug having its pores opened sufficiently to permit passage of oil.

4. A lubricating device consisting of an oil cup having an oil reservoir and a neck or hollow stem for connecting the cup to the part to be lubricated, and a wooden plug tightly fitted and under compression, in said neck, and operative to control the feed of oil from said reservoir.

5. A lubricating device comprising an oil tight oil cup, a stem for connection to a bearing and having an opening, an opening adjacent the lower end of the reservoir, a close grained wooden plug in the opening and having opened pores for conducting oil from the reservoir to the opening in the stem.

6. A lubricating device comprising an oil tight oil cup, an opening adjacent the lower end of the reservoir, a stem for connection to the machinery to feed the oil to a bearing, a wooden plug having open pores for the delivery of oil, the stem and plug having a substantially continuously tapered opening outwardly and in the direction of flow of the oil.

In testimony whereof I affix my signature.

JOHN CESSNA SHARP.